(12) United States Patent
Rangi et al.

(10) Patent No.: US 10,763,629 B1
(45) Date of Patent: Sep. 1, 2020

(54) INTEGRATED ASSEMBLY OF AN ELECTRICAL CONDUCTOR, A FUSE AND A CONNECTOR

(71) Applicant: Lear Corporation, Southfield, MI (US)

(72) Inventors: Bhupinder Rangi, Novi, MI (US); David Menzies, Linden, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/538,241

(22) Filed: Aug. 12, 2019

(51) Int. Cl.
| H01R 25/16 | (2006.01) |
| H01R 13/506 | (2006.01) |
| H01R 13/688 | (2011.01) |
| H01R 13/11 | (2006.01) |
| B60R 16/03 | (2006.01) |

(52) U.S. Cl.
CPC ......... *H01R 25/168* (2013.01); *H01R 13/113* (2013.01); *H01R 13/506* (2013.01); *H01R 13/688* (2013.01); *B60R 16/03* (2013.01); *H01R 2201/26* (2013.01)

(58) Field of Classification Search
CPC .......... H01R 25/168; H01R 2201/26; H01R 13/113; H01R 13/506; H01R 13/688
USPC ............................. 439/620.27, 76.1
See application file for complete search history.

(56) References Cited

U.S. PATENT DOCUMENTS

| 4,842,534 | A | | 6/1989 | Mobley et al. | |
| 5,474,475 | A | * | 12/1995 | Yamaguchi | H01H 85/2035 439/620.27 |
| 5,551,894 | A | * | 9/1996 | Lin | H01H 85/2045 439/620.27 |
| 5,971,796 | A | * | 10/1999 | Duhr | H01R 13/516 439/364 |
| 6,045,412 | A | * | 4/2000 | Guanco | H01R 13/4361 439/752 |
| 6,514,091 | B2 | * | 2/2003 | Saito | B60R 16/0238 439/65 |
| 6,634,892 | B2 | * | 10/2003 | Nakamura | H01R 9/24 439/210 |
| 6,830,481 | B1 | * | 12/2004 | Umeshita | H01H 85/2035 439/620.27 |
| 7,652,552 | B2 | | 1/2010 | Fussl et al. | |
| 7,893,364 | B2 | * | 2/2011 | Oda | H05K 7/026 174/520 |
| 8,163,994 | B2 | * | 4/2012 | Taniguchi | H02G 3/081 174/50 |
| 9,627,785 | B1 | * | 4/2017 | Melchor Saucedo | H01R 13/506 |
| 10,218,130 | B1 | * | 2/2019 | Jung | H01H 85/20 |
| 10,349,539 | B2 | * | 7/2019 | Reynoso Galvan | H05K 3/361 |

(Continued)

*Primary Examiner* — Harshad C Patel
(74) *Attorney, Agent, or Firm* — MacMillan, Sobanski & Todd, LLC

(57) ABSTRACT

An integrated assembly of an electrical conductor, a fuse, and a connector includes a conductor body having a conductor terminal secured thereto. A conductor housing includes a support portion engaging the conductor body and a connector interface containing the conductor terminal. The conductor cover is releasably secured to the support portion and covers the conductor body. The fuse is disposed within the connector interface and is connected to the conductor terminal. A connector includes a connector housing that is supported on the connector interface and a connector terminal that is disposed within the connector housing. The connector terminal is connected to the fuse to complete the integrated assembly.

12 Claims, 6 Drawing Sheets

(56) References Cited

U.S. PATENT DOCUMENTS

| | | | |
|---|---|---|---|
| 2004/0109296 A1* | 6/2004 | Nakayama | H01R 9/223 361/752 |
| 2004/0219806 A1* | 11/2004 | Kobayashi | B60R 16/0239 439/76.2 |
| 2005/0227542 A1* | 10/2005 | Fukushima | H01R 9/245 439/620.27 |
| 2009/0309689 A1* | 12/2009 | Pavlovic | H01H 85/153 337/187 |
| 2010/0041510 A1* | 2/2010 | Gladd | H01R 13/514 475/331 |
| 2010/0203746 A1* | 8/2010 | Kita | H01H 85/2035 439/76.1 |
| 2010/0317241 A1* | 12/2010 | Sugiura | H01R 9/245 439/733.1 |
| 2012/0329296 A1* | 12/2012 | Hara | B60R 16/0238 439/76.1 |
| 2016/0073520 A1* | 3/2016 | Darr | H05K 7/026 361/752 |
| 2017/0311457 A1* | 10/2017 | Kubota | H05K 7/1432 |
| 2018/0076586 A1* | 3/2018 | Rangi | H01R 31/06 |
| 2019/0104622 A1* | 4/2019 | Reynoso Galvan | H05K 5/0069 |

\* cited by examiner

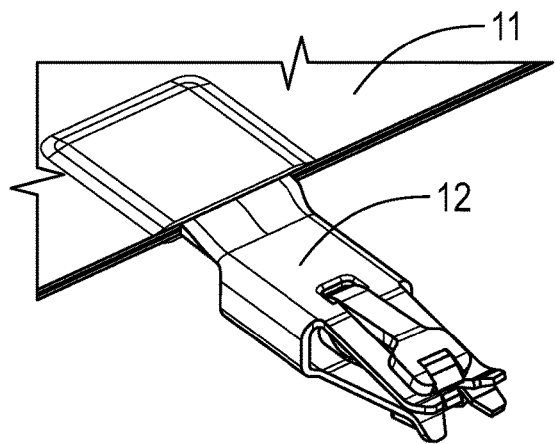
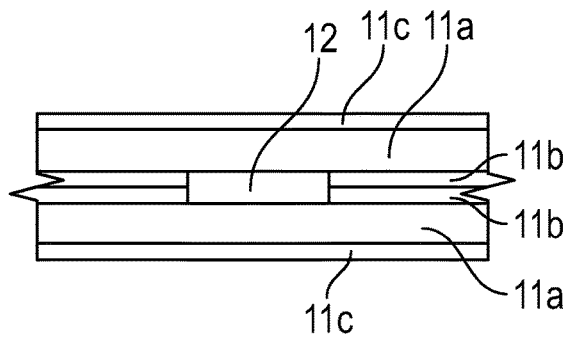
FIG. 2　　　　FIG. 3
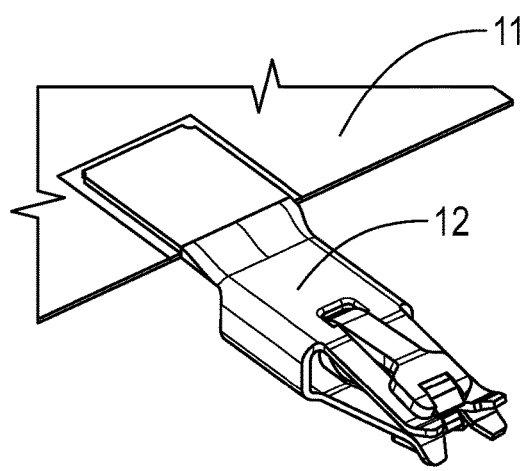
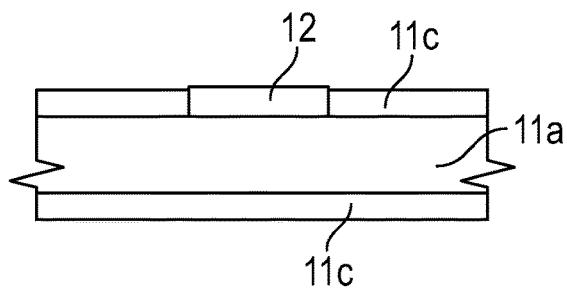
FIG. 4　　　　FIG. 5

INTEGRATED ASSEMBLY OF AN ELECTRICAL CONDUCTOR, A FUSE AND A CONNECTOR

BACKGROUND OF THE INVENTION

This invention relates in general to electrical distribution systems for supplying electrical energy from a single source of electrical energy to a plurality of electrically-operated devices. In particular, this invention relates to an integrated assembly of an electrical conductor, fuse, and connector that may be used, for example, in an automotive electrical distribution system.

In most electrical distribution systems, an electrical conductor is provided for supplying electrical energy from a source of electrical energy to an electrically-operated device. In many instances, a single electrical conductor is provided for supplying electrical energy from a single source of electrical energy to a plurality of electrically-operated devices. In those instances, the single electrical conductor (commonly referred to as a bus bar) is frequently formed from a relatively rigid metallic material that is pre-formed to a desired shape. Typically, the outer surface of the electrical conductor is covered by an electrical insulator material except at a plurality of predetermined exposed contact areas, which are not covered by the electrical insulator material. Those exposed contact areas facilitate the connection of respective conductor terminals to the electrical conductor, allowing each of these conductor terminals to quickly and easily provide electrical energy to respective electrically-operated devices.

Many electrical distribution systems of this general type also include one or more fuses that are provided to protect the electrically-operated devices from damage resulting from the passage of excessive amounts of electrical current therethrough. In single electrical conductor systems such as those described above, respective fuses are typically connected between the single electrical conductor and each of the electrically-operated devices connected thereto.

Although known electrical distribution systems such as those described above have functioned satisfactorily, it would be desirable to provide an integrated assembly of an electrical conductor, fuse, and connector that may be used, for example, in an automotive electrical distribution system.

SUMMARY OF THE INVENTION

This invention relates to invention relates to an integrated assembly of an electrical conductor, fuse, and connector that may be used, for example, in an automotive electrical distribution system. The integrated assembly includes a conductor body having a conductor terminal secured thereto. A conductor housing includes a support portion engaging the conductor body and a connector interface containing the conductor terminal. A conductor cover is releasably secured to the support portion and covers the conductor body. A fuse is disposed within the connector interface and is connected to the conductor terminal. A connector includes a connector housing that is supported on the connector interface and a connector terminal that is disposed within the connector housing. The connector terminal is connected to the fuse to complete the integrated assembly.

Various aspects of this invention will become apparent to those skilled in the art from the following detailed description of the preferred embodiments, when read in light of the accompanying drawings.

BRIEF DESCRIPTION OF THE DRAWINGS

FIG. 2 is an enlarged perspective view of a portion of a first embodiment of the electrical conductor illustrated in FIG. 1 and its connection with a conductor terminal.

FIG. 3 is an enlarged sectional elevational view of the first embodiment of the electrical conductor taken along line 3-3 of FIG. 2.

FIG. 4 is an enlarged perspective view of a portion of a second embodiment of the electrical conductor illustrated in FIG. 1 and its connection with a conductor terminal.

FIG. 5 is an enlarged sectional elevational view of the second embodiment of the electrical conductor taken along line 5-5 of FIG. 4.

DETAILED DESCRIPTION OF THE PREFERRED EMBODIMENTS

Figure 1:
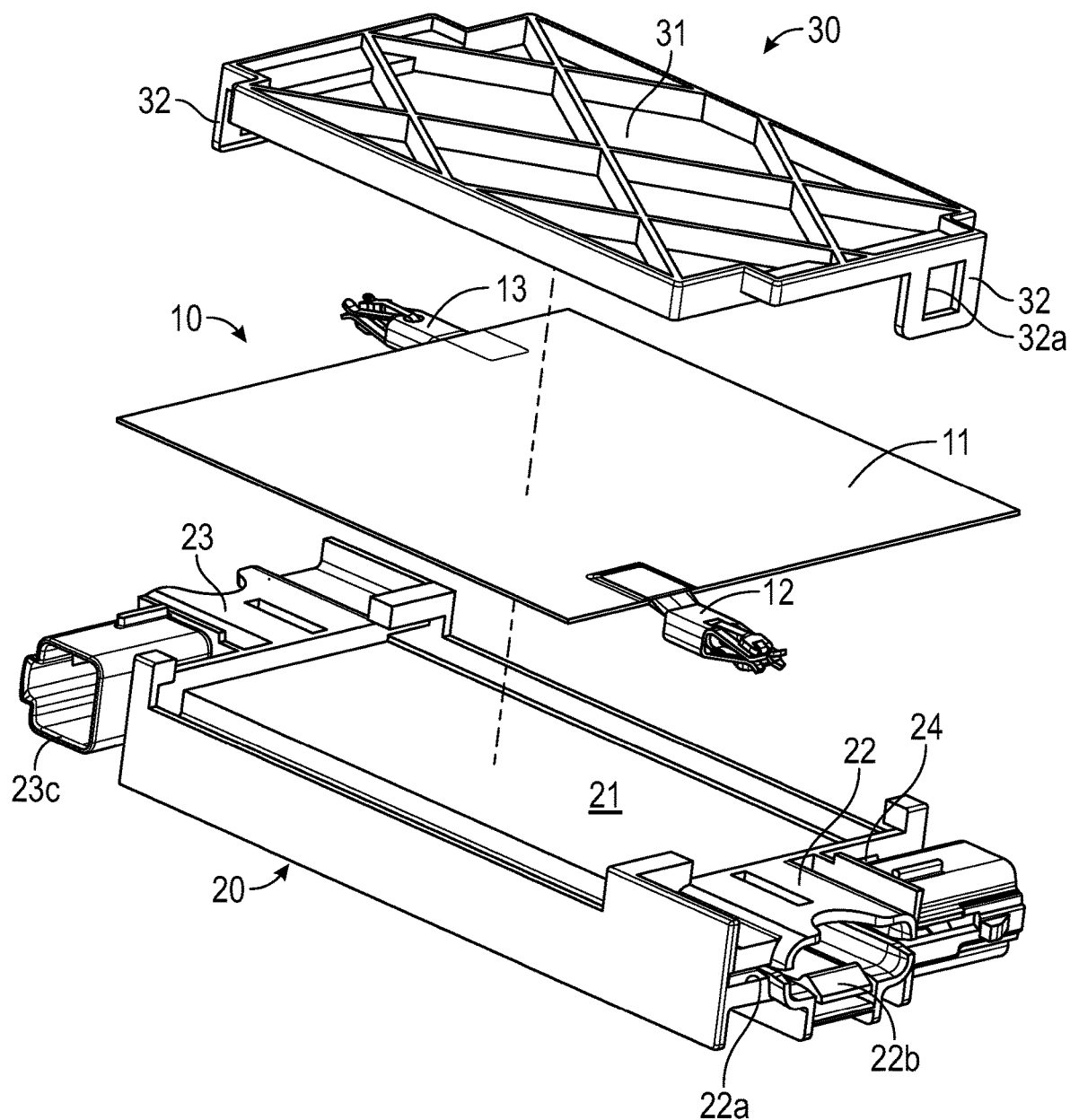
FIG. 1 is an exploded perspective view of an electrical conductor, a conductor housing, and a conductor cover in accordance with this invention.

Referring now to the drawings, there is illustrated in FIGS. 1 through 7 an assembly of an electrical conductor (indicated generally at 10), a conductor housing (indicated generally at 20), and a conductor cover (indicated generally at 30) in accordance with this invention. The illustrated electrical conductor 10 includes a conductor body 11 that is preferably embodied as an elongated flat, planar strip of material having a relatively small thickness as compared to a length and/or width thereof. Also, the conductor body 11 is preferably formed from a metallic material, such as copper or aluminum, that is electrically conductive. As a result, the conductor body 11 is flexible (i.e., capable of being bent or flexed or twisted without breaking), which advantageously allows it to be easily deformed to a desired shape for facilitating assembly and installation. However, the conductor body 11 may be formed having any desired thickness or shape, and further may be formed from any desired electrically conductive material.

As shown in FIGS. 2 and 3, the conductor body 11 may be embodied as multiple layers 11a (such as two layers in the illustrated embodiment) of the electrically conductive material. If desired, adjacent pairs of such multiple layers 11a may be separated from one another by one or more intermediate layers 11b of an electrically non-conductive material, although such is not required. Alternatively, as shown in FIGS. 4 and 5, the conductor body 11 may be embodied as a single layer 11a of the electrically conductive material. In both instances, some or all of each of the outer surfaces of the conductor body 11 may be covered by a layer of an electrically non-conductive material 11c (see FIGS. 2 through 5), although again such is not required.

First and second conductor terminals 12 and 13 are secured to the conductor body 11 to facilitate the connection of the electrical conductor 10 to respective electrically-operated devices (not shown) in an electrical distribution system, such as described above. In the illustrated embodiment, two of such conductor terminals 12 and 13 are secured to opposite edges of the conductor body 11. However, any desired number of such conductor terminals 12 and 13 may be secured at any desired locations on the conductor body 11. Each of the illustrated first and second conductor terminals 12 and 13 is a female terminal that is adapted to receive a male blade terminal (not shown) therein. However, the first and second conductor terminals 12 and 13 may be embodied having any desired structure or combination of structures.

FIGS. 2 and 3 illustrate a first embodiment of a connection between a multiple layer conductor body 11 and the first conductor terminal 12. As shown therein, a contact portion of the first conductor terminal 12 extends between the adjacent layers 11a of the multiple layer conductor body 11. The contact portion of the first conductor terminal 12 may be secured to either or both of the adjacent layers 11a of the conductor body 11 in any desired manner, such as by welding for example. Similarly, FIGS. 4 and 5 illustrate a second embodiment of a connection between a single layer conductor body 11 and the first conductor terminal 12. As shown therein, a contact portion of the first conductor terminal 12 extends adjacent to the single layer 11a of the conductor body 11. The contact portion of the first conductor terminal 12 may also be secured to the adjacent layer 11a of the conductor body 11 in any desired manner, such as by welding for example.

As best shown in FIG. 1, the illustrated conductor housing 20 includes a central support portion 21 having first and second connector interfaces 22 and 23 provided on opposite sides thereof. The conductor housing 20 is preferably molded from a lightweight, electrically non-conductive material, such as plastic. However, the conductor housing 20 may be formed in any desired manner, having any desired shape, and from any desired material. As will be explained in detail below, each of the first and second connector interfaces 22 and 23 provided on the conductor housing 20 corresponds with a respective one of the first and second conductor terminals 12 and 13 provided on the conductor body 11 of the electrical connector 10. Elongated slots 22a and 23a or similar openings are respectively provided through the connector interfaces 22 and 23. Also, respective retainers 22b and 23b are provided within each of the connector interfaces 22 and 23 adjacent to the associated slots 22a and 23a. Additionally, the connector interfaces 22 and 23 are provided with respective lateral openings 22c and 23c. The purposes of the slots 22a and 23a, the retainers 22b and 23b, and the openings 22c and 23c will be explained below. Lastly, the support portion 21 of the conductor housing 20 includes a pair of outwardly extending protrusions 24 (one of which is visible in FIG. 1). The illustrated protrusions 24 extend from opposite sides of the support portion 21 of the conductor housing 20 and are provided for a purpose that will also be explained below.

As also best shown in FIG. 1, the illustrated conductor cover 30 includes a central panel 31 that is generally flat and rectangular in shape. The panel 31 is preferably molded from a lightweight, electrically non-conductive material, such as plastic. However, the panel 31 may be formed in any desired manner, having any desired shape, and from any desired material. The panel 31 additionally includes a pair of retainers 32 (one of which is visible in FIG. 1). The illustrated retainers 32 extend from opposite sides of the panel 31 of the conductor cover 30 and have respective openings 32a extending therethrough. As will be explained in greater detail below, the openings 32a through the retainers 32 provided on the panel 31 are adapted to receive the protrusions 24 that extend from the support portion 21 to releasably retain the conductor cover 30 on the conductor housing 20.

Figure 6:
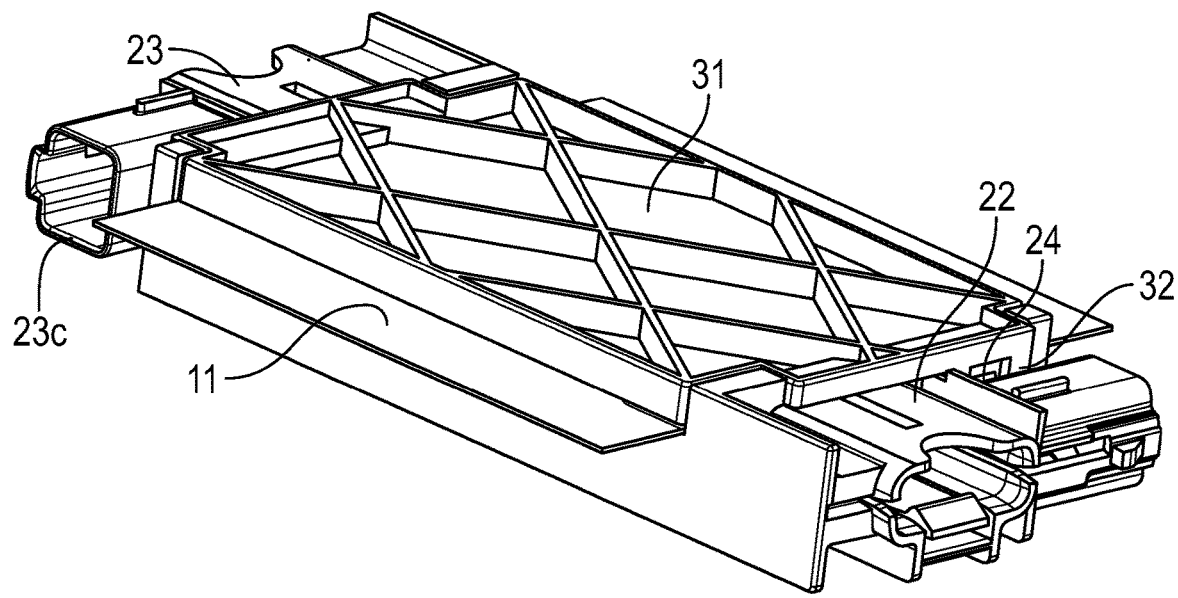
FIG. 6 is a perspective view of the electrical conductor, the conductor housing, and the conductor cover illustrated in FIG. 1 shown assembled.
Figure 7:
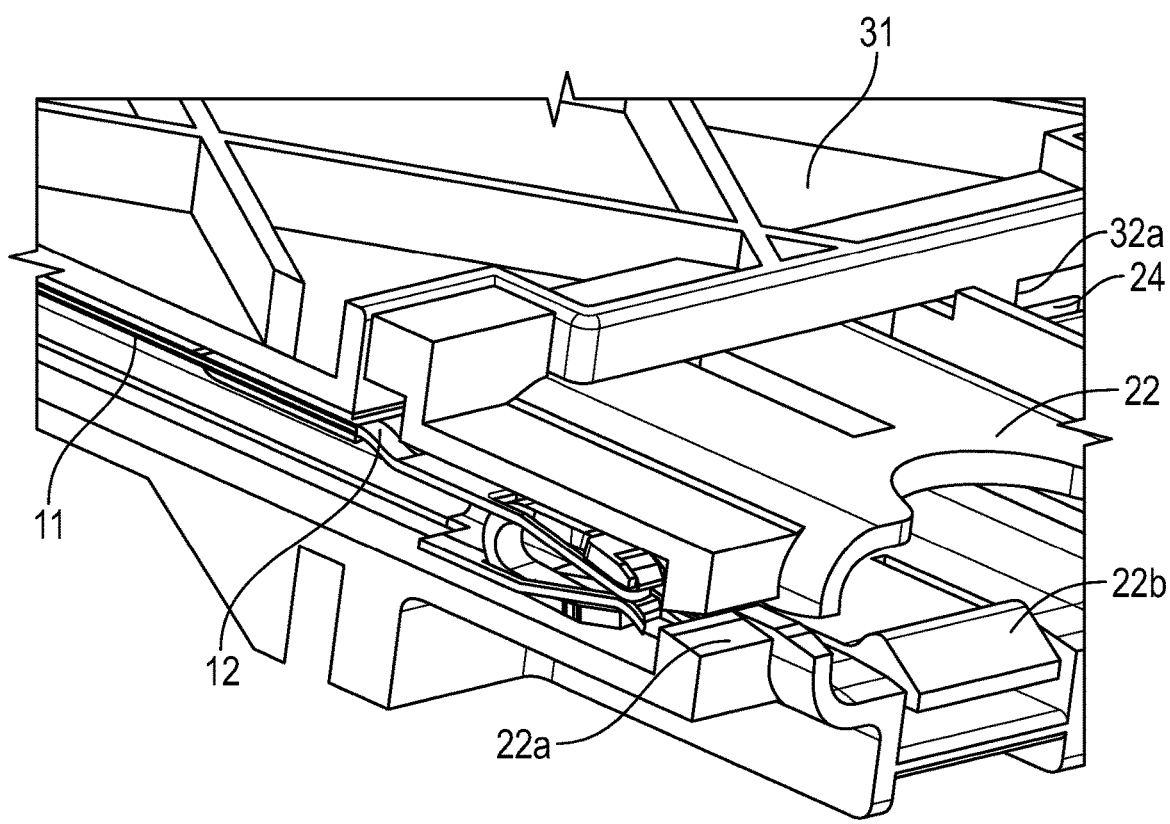
FIG. 7 is an enlarged perspective view, partially broken away for clarity, of portions of the assembly of the electrical conductor, the conductor housing, and the conductor cover illustrated in FIG. 6.

FIGS. 6 and 7 illustrate the electrical conductor 10, the conductor housing 20, and the conductor cover 30 in an assembled condition. As shown therein, the conductor body 11 of the electrical conductor 10 is disposed between the support portion 21 of the conductor housing 20 and the panel 31 of the conductor cover 30. To accomplish this, the conductor body 11 of the electrical conductor 10 is initially disposed adjacent to the support portion 21 of the conductor housing 20. When so disposed, the first and second conductor terminals 12 and 13 extend from the conductor body 11 into respective portions of the connector interfaces 22 and 23 provided on the conductor housing 20, as shown in FIG. 7. Then, the panel 31 of the conductor cover 30 is disposed adjacent to the conductor body 11 of the electrical conductor 10. The retainers 32 provided on the panel 31 of the conductor cover 30 are aligned with the protrusions 24 provided on the support portion 21 of the conductor housing 20. As a result, when the conductor cover 30 is moved adjacent to the conductor body 11 as shown FIGS. 6 and 7, the protrusions 24 extend through the openings 32a of the retainers 32 such that the conductor cover 30 is releasably retained on the conductor housing 20.

Figure 8:
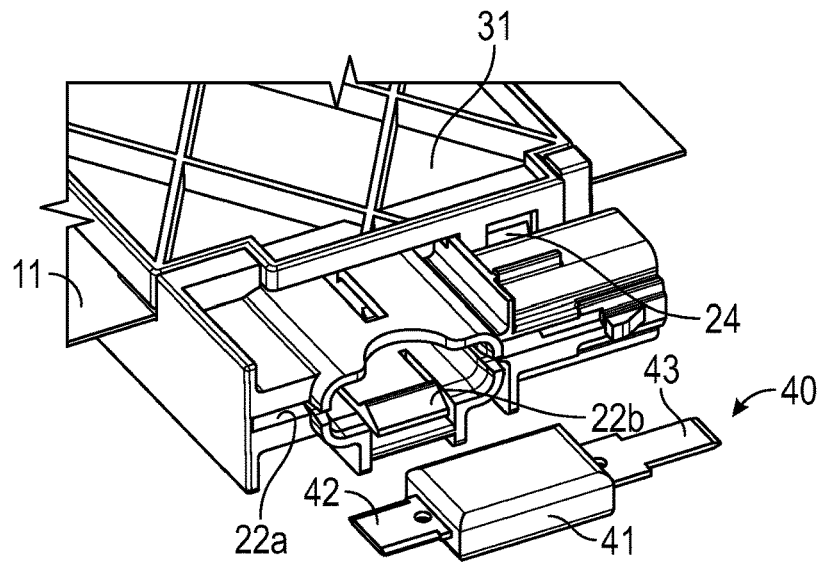
FIG. 8 is an exploded perspective view of a portion of the assembly of the electrical conductor, the conductor housing, and the conductor cover illustrated in FIGS. 6 and 7, together with a fuse shown prior to installation.
Figure 9:
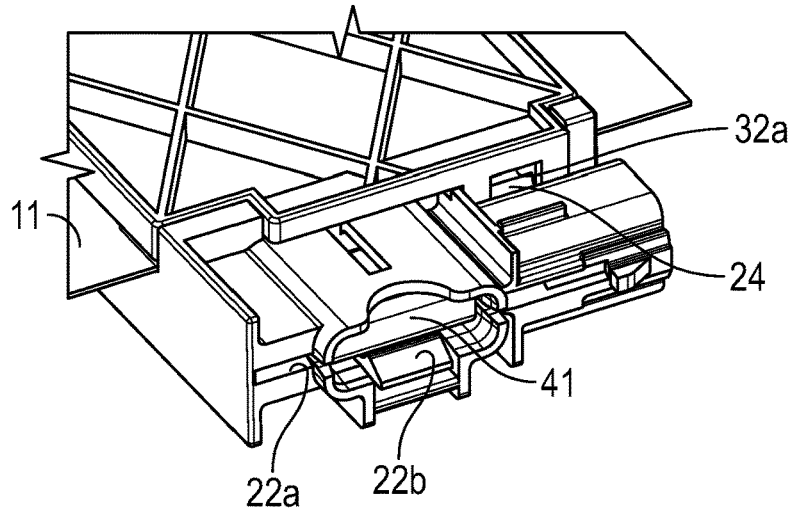
FIG. 9 is a perspective view similar to FIG. 8 showing the fuse after having been installed on the assembly of the electrical conductor, the conductor housing, and the conductor cover.
Figure 10:
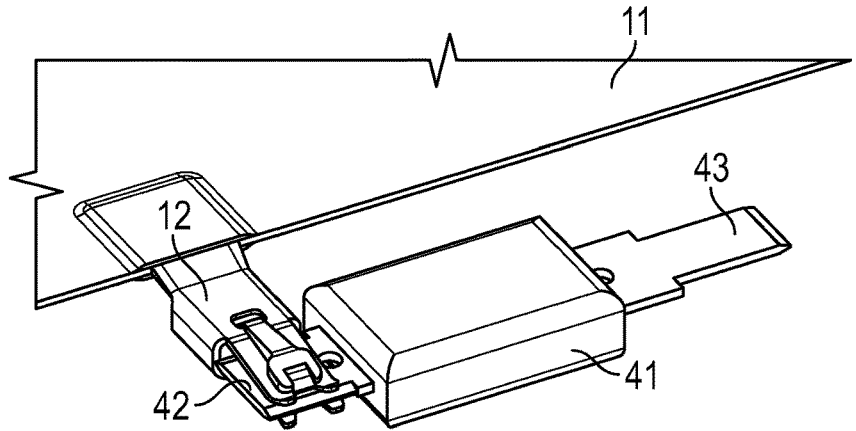
FIG. 10 is a perspective view similar to FIG. 9 wherein the conductor housing and the conductor cover have been removed for clarity.

FIGS. 8, 9, and 10 illustrate the manner in which a fuse, indicated generally at 40, may be installed onto the combined assembly of the electrical conductor 10, the conductor housing 20, and the conductor cover 30. The illustrated fuse 40 includes a body 41 having first and second fuse terminals 42 and 43 extending therefrom. The fuse 40 is, of itself, conventional in the art and, as is well known, is adapted to prevent more than a predetermined maximum amount of electrical current from passing therethrough. If the amount of electrical current passing through the fuse 40 exceeds this predetermined maximum amount, then the body 41 will create an open electrical circuit between the first and second fuse terminals 42 and 43 and, thus, prevent further electrical current from passing through the fuse 40. The illustrated first and second fuse terminals 42 and 43 are each embodied as male blade terminals, although such is not required.

As shown in FIG. 8, the fuse 40 is initially aligned with the slot 22a extending through the first connector interface 22 of the conductor housing 20. Then, as shown in FIGS. 9 and 10, the fuse 40 is moved through the slot 22a and into the interior of the connector interface 22 such that the first terminal 42 of the fuse 40 is connected to the first conductor terminal 12 provided on the conductor body 11. As a result, an electrically conductive path is provided from the conductor body 11 through the first conductor terminal 12, the first terminal 42 of the fuse 40, and the body 41 of the fuse 40 to the second terminal 43 of the fuse 40. A similar fuse (not shown) may be installed on the second conductor terminal 13 disposed within the second connector interface 23 of the conductor housing 20 in the same manner.

Figure 11:
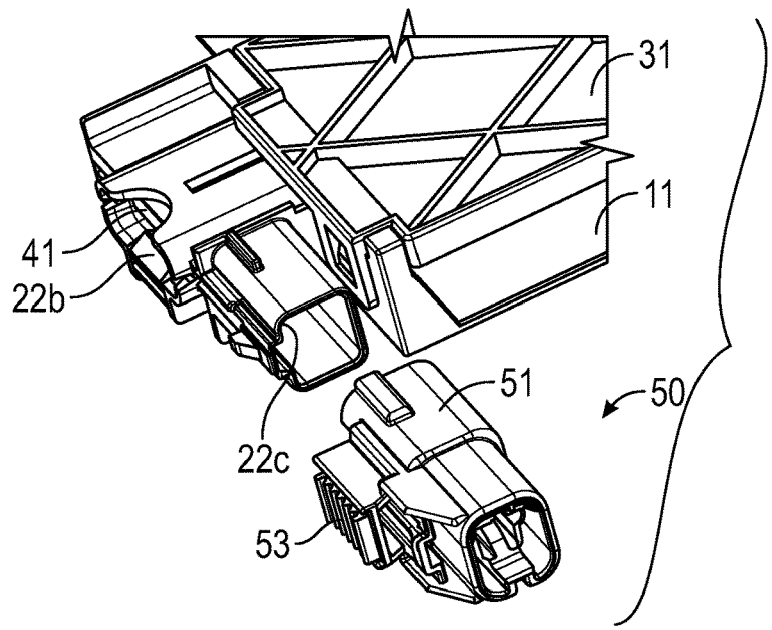
FIG. 11 is an exploded perspective view of a portion of the assembly of the electrical conductor, the conductor housing, the conductor cover, and the fuse illustrated in FIGS. 9 and 10, together with a connector shown prior to installation.
Figure 12:
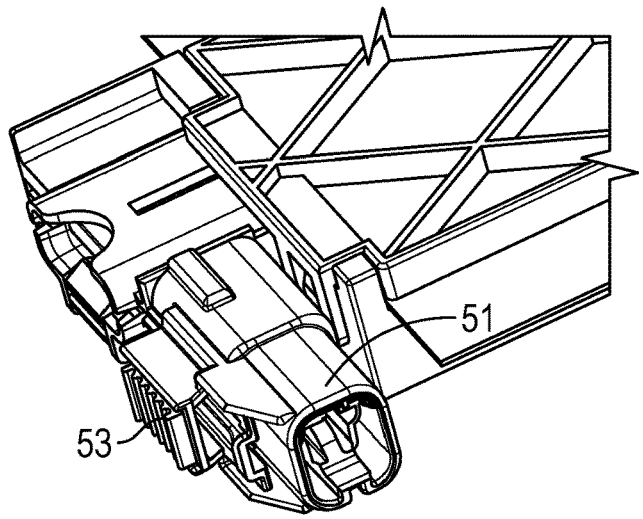
FIG. 12 is a perspective view similar to FIG. 11 showing the connector after having been installed on the assembly of the electrical conductor, the conductor housing, the conductor cover, and the fuse.
Figure 13:
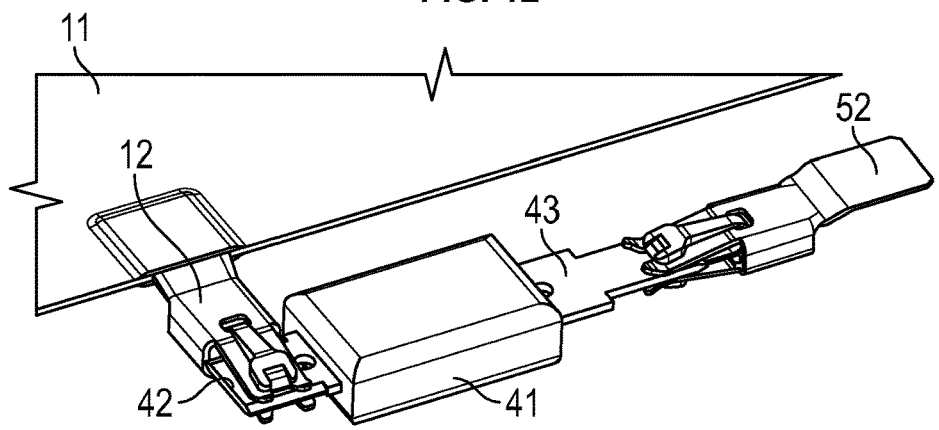
FIG. 13 is a perspective view similar to FIG. 12 wherein the conductor housing, the conductor cover, and a connector housing of the connector have been removed for clarity.
Figure 14:
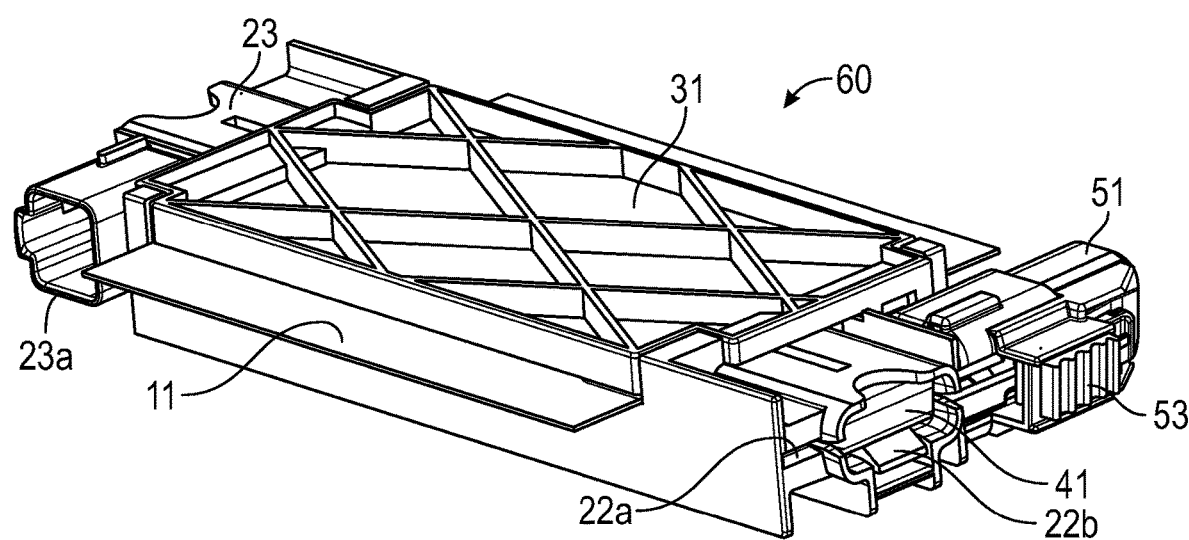
FIG. 14 is a perspective view showing the integrated assembly of the electrical conductor, the fuse, and the connector in accordance with this invention.

FIGS. 11, 12, and 13 illustrate the manner in which a connector, indicated generally at 50, may be installed upon the combined assembly of the electrical conductor 10, the conductor housing 20, and the conductor cover 30 to complete an integrated assembly, indicated generally at 60 in FIG. 14, of the electrical conductor 20, the fuse 40, and the connector 50 in accordance with this invention. The connector 50 is, of itself, conventional in the art and is adapted to connect the second terminal 43 of the fuse 40 to an electrically-operated device (not shown), as described above. To accomplish this, the connector 50 includes a hollow connector housing 51 that supports a connector terminal 52 therein. The illustrated connector housing 51 is preferably molded from a lightweight, electrically non-conductive material, such as plastic. However, the connector housing 51 may be formed by any desired process, having any desired shape, and from any desired material. The illustrated connector terminal 52 is a female terminal that is adapted to receive a male blade terminal therein. However, the connector terminal 52 may be embodied having any desired structure. Additionally, if desired, the connector 50 may be provided with a connector position assurance 53, the structure and operation of which is conventional in the art.

As shown in FIG. 11, the connector housing 51 of the connector 50 is initially aligned with the lateral opening 22c extending through the first connector interface 22 of the conductor housing 20. As a result, the connector terminal 52 (which is supported within the connector housing 51) is aligned with the second terminal 43 of the fuse 40 (which is supported within the first connector interface 22). Then, as shown in FIGS. 12 and 13, the connector housing 51 is moved over the lateral opening 22c extending through the first connector interface 22 of the conductor housing 20. Consequently, the connector terminal 52 supported within the connector housing 51 is connected to the second terminal 43 of the fuse 40. As a result, the electrically conductive path described above is extended from the second terminal 42 of the fuse 40 through the connector terminal 52 to the electrically-operated device. A similar connector (not shown) may be installed on the second connector interface 23 in the same manner. This completes the assembly of the integrated assembly 60 of the electrical conductor 20, the fuse 40, and the connector 50 in accordance with this invention.

The illustrated integrated assembly 60 is particularly suited for use in an automotive or other vehicular electrical distribution system, wherein a single electrical conductor is provided for supplying electrical energy from a source of electrical energy to a plurality of electrically-operated devices. However, as will become apparent from the following description, the integrated assembly 60 of this invention may be used in any desired environment for any desired purpose.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly of an electrical conductor, a fuse, and a connector comprising:
    a conductor body including a conductor terminal secured thereto;
    a conductor housing including a support portion engaging the conductor body and a connector interface containing the conductor terminal;
    the fuse disposed within the connector interface and connected to the conductor terminal; and
    the connector including a connector housing supported on the connector interface and a connector terminal disposed within the connector housing and connected to the fuse.

2. The assembly defined in claim 1 wherein the conductor body is an elongated flat, planar strip of material.

3. The assembly defined in claim 1 wherein the conductor body has multiple layers, and wherein a portion of the conductor terminal extends between adjacent ones of the multiple layers is secured to the adjacent ones of the multiple layers.

4. The assembly defined in claim 1 wherein the conductor body has a single layer, and wherein a portion of the conductor terminal is secured to an outer surface of the single layer.

5. The assembly defined in claim 1 wherein the support portion of the conductor housing engages a first surface of the conductor body, and further including a conductor cover that is secured to the conductor housing and engages a second surface of the conductor body opposite to the first surface.

6. The assembly defined in claim 5 wherein the conductor housing includes a protrusion and the conductor cover includes a retainer that cooperates with the protrusion on the conductor housing to releasably secure the conductor cover to the conductor housing.

7. The assembly defined in claim 5 wherein the conductor housing includes first and second protrusions and the conductor cover includes first and second retainers that respectively cooperate with the first and second protrusions on the conductor housing to releasably secure the conductor cover to the conductor housing.

8. The assembly defined in claim 1 further including a plurality of conductor terminals secured to the conductor body and a plurality of connector interfaces provided on the conductor housing and respectively containing the plurality of conductor terminals.

9. The assembly defined in claim 8 further including a plurality of fuses respectively disposed within the plurality of connector interfaces and respectively connected to the plurality of conductor terminals.

10. The assembly defined in claim 9 further including a plurality of connectors having respective connector housings respectively supported on the plurality of connectors and a plurality of connector terminals respectively disposed within the plurality of connector housings and respectively connected to the plurality of fuses.

11. The assembly defined in claim 1 wherein the connector interface includes a retainer that retains the fuse within the connector interface.

12. The assembly defined in claim 1 wherein the connector interface includes an opening and the connector is supported on the connector interface such that the connector terminal extends through the opening into engagement with the fuse.

* * * * *